US011074331B2

(12) United States Patent
Fujimaki

(10) Patent No.: US 11,074,331 B2
(45) Date of Patent: Jul. 27, 2021

(54) INFORMATION PROCESSING APPARATUS AND NON- TRANSITORY COMPUTER READABLE MEDIUM STORING PROGRAM FOR ACCESS CONTROL

(71) Applicant: FUJIFILM BUSINESS INNOVATION CORP., Tokyo (JP)

(72) Inventor: Yoshihiro Fujimaki, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 247 days.

(21) Appl. No.: 16/122,290

(22) Filed: Sep. 5, 2018

(65) Prior Publication Data
US 2019/0108326 A1  Apr. 11, 2019

(30) Foreign Application Priority Data

Oct. 11, 2017  (JP) .............................. JP2017-197717

(51) Int. Cl.
*G06F 21/33* (2013.01)
*H04L 9/32* (2006.01)
*G06F 21/62* (2013.01)

(52) U.S. Cl.
CPC ........ *G06F 21/335* (2013.01); *G06F 21/6218* (2013.01); *H04L 9/3213* (2013.01); *H04L 9/3228* (2013.01); *H04L 9/3234* (2013.01)

(58) Field of Classification Search
CPC ... G06F 21/335; G06F 21/6218; H04L 9/3213
See application file for complete search history.

(56) References Cited

U.S. PATENT DOCUMENTS

| 7,058,971 | B1* | 6/2006 | Horikiri | ............... G06F 21/6218 |
| | | | | 709/229 |
| 8,086,570 | B2* | 12/2011 | Kawabe | .................. G06F 16/93 |
| | | | | 707/638 |
| 8,782,768 | B2* | 7/2014 | Larsson | .................. G06F 21/41 |
| | | | | 726/9 |
| 2005/0187937 | A1* | 8/2005 | Kawabe | ............... G06F 21/6218 |
| 2006/0010323 | A1* | 1/2006 | Martin | .................. H04L 63/101 |
| | | | | 713/171 |

(Continued)

FOREIGN PATENT DOCUMENTS

JP          5562143 B2     7/2014

OTHER PUBLICATIONS

D. Hardt, "OAuth 2.0 Authorization Framework" (Year: 2012).*

(Continued)

*Primary Examiner* — Mahfuzur Rahman
*Assistant Examiner* — Richard W Cruz-Franqui
(74) *Attorney, Agent, or Firm* — Oliff PLC

(57) ABSTRACT

An information processing apparatus comprises a controller configured to: (1) receive, from a first user authorized to access a resource, an access control setting applicable to a second user, the access control setting set within an authority of the first user; (2) receive, in response to a successful authentication of the second user, an access permission request for the resource from the second user; and (3) request, if what is requested in the access permission request is allowed by the access control setting, the resource to execute a process according to the access permission request.

6 Claims, 7 Drawing Sheets

(56) References Cited

U.S. PATENT DOCUMENTS

| | | | |
|---|---|---|---|
| 2006/0259983 A1* | 11/2006 | Sperry | H04L 9/3234 726/28 |
| 2007/0056034 A1* | 3/2007 | Fernstrom | G06F 21/6227 726/20 |
| 2007/0174347 A1* | 7/2007 | Wenn | G06F 16/93 |
| 2007/0255743 A1* | 11/2007 | Gaucas | G06F 21/6218 |
| 2007/0288714 A1* | 12/2007 | Nakamura | G06F 21/604 711/163 |
| 2007/0299969 A1* | 12/2007 | Kunitake | G06F 16/93 709/225 |
| 2010/0124355 A1* | 5/2010 | Saito | H04N 1/444 382/100 |
| 2011/0131175 A1* | 6/2011 | Kawai | G06F 21/6272 707/608 |
| 2011/0153671 A1* | 6/2011 | Taniguchi | G06F 21/604 707/786 |
| 2011/0321176 A1* | 12/2011 | Matsugashita | G06F 21/608 726/28 |
| 2012/0117629 A1* | 5/2012 | Miyazawa | H04L 63/101 726/4 |
| 2012/0331571 A1* | 12/2012 | Vandervort | G06F 21/6209 726/30 |
| 2013/0066792 A1* | 3/2013 | Vandervort | G06F 21/10 705/310 |
| 2014/0245402 A1* | 8/2014 | Matsugashita | G06F 21/608 726/4 |
| 2014/0289408 A1* | 9/2014 | Ishino | H04L 63/102 709/225 |
| 2015/0089623 A1* | 3/2015 | Sondhi | H04L 63/0815 726/9 |
| 2015/0169266 A1* | 6/2015 | Iwasaki | G06F 3/1287 358/1.14 |
| 2016/0085488 A1* | 3/2016 | Otake | G06F 21/31 358/1.14 |
| 2016/0112429 A1* | 4/2016 | Sundaresan | H04L 63/08 726/4 |
| 2016/0164878 A1* | 6/2016 | Nakano | H04L 63/101 726/4 |
| 2016/0274822 A1* | 9/2016 | Iwasaki | G06F 3/1287 |
| 2017/0195407 A1* | 7/2017 | Miura | H04L 67/1002 |
| 2017/0244864 A1* | 8/2017 | Ishino | H04L 63/108 |
| 2017/0346754 A1* | 11/2017 | Sinha | H04L 47/527 |
| 2018/0267955 A1* | 9/2018 | Catalano | H04L 51/32 |
| 2018/0300471 A1* | 10/2018 | Jain | H04W 12/61 |
| 2019/0108326 A1* | 4/2019 | Fujimaki | G06F 21/335 |
| 2019/0253255 A1* | 8/2019 | Mani | H04L 69/28 |
| 2020/0125700 A1* | 4/2020 | Chang | H04L 67/2804 |

OTHER PUBLICATIONS

NPL Search (Google Scholar) (Year: 2020).*
OAuth 2.0 Authorization Framework (Hardt) (Year: 2012).*
NPL Search (Google Scholar) (Year: 2021).*

* cited by examiner

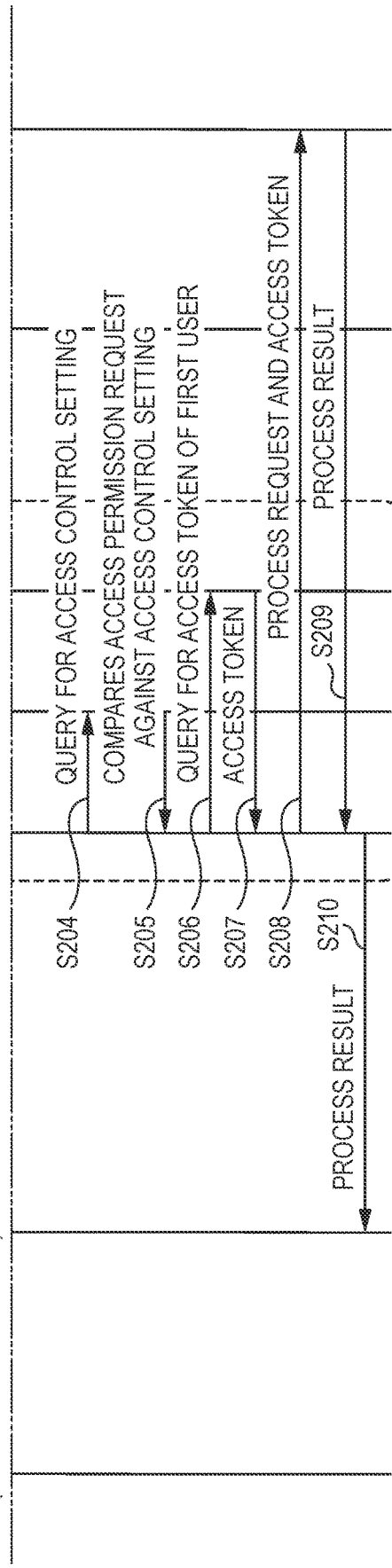

FIG. 3

```
EMPLOYEE_12345, CREATE AN ACCESS CONTROL SETTING OF THE
DOCUMENT MANAGEMENT SYSTEM.

APPLICABLE USER
[ SUBCONTRACTOR_ABCDE           ]   [ BROWSE ]

ALLOWED SERVER
[ somehostname.com              ]   [ BROWSE ]

ALLOWED OPERATION
[ GET /dms/document (SEE DOCUMENTS)          ▽ ]
  POST /dms/document (EDIT DOCUMENTS)
  PUT /dms/document (UPDATE DOCUMENTS)
  DELETE /dms/document (DELETE DOCUMENTS)

ALLOWED DOCUMENTS
[ 000, 001, 002, 003            ]   [ BROWSE ]

ALLOWED PERIOD
[ 20170201T0000 ]  -  [ 20170207T2359 ]

SUBCONTRACTOR_ABCDE, REQUEST A PERMISSION TO ACCESS
THE DOCUMENT MANAGEMENT SYSTEM

ACCESS CONTROLLING USER

| EMPLOYEE_12345 | BROWSE |

REQUESTED SERVER

| somehostname.com | BROWSE |

REQUESTED OPERATION

| GET /dms/document (SEE DOCUMENTS) ▽ |
| POST /dms/document (EDIT DOCUMENTS) |
| PUT /dms/document (UPDATE DOCUMENTS) |
| DELETE /dms/document (DELETE DOCUMENTS) |

REQUESTED DOCUMENTS

| OOO | BROWSE |

OK

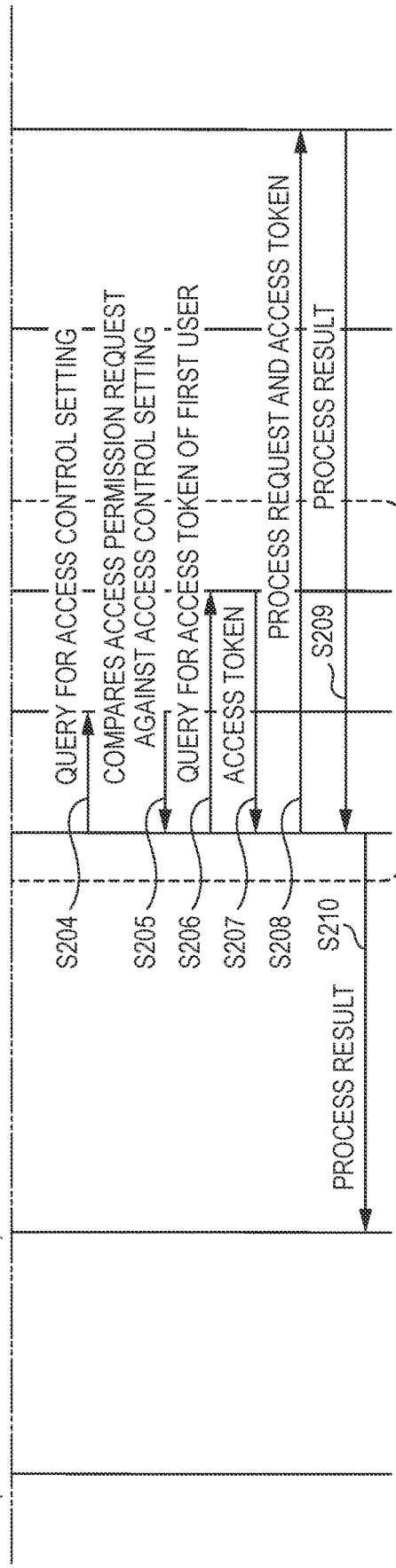

… # INFORMATION PROCESSING APPARATUS AND NON-TRANSITORY COMPUTER READABLE MEDIUM STORING PROGRAM FOR ACCESS CONTROL

CROSS REFERENCE TO RELATED APPLICATION

This application is based on and claims priority under 35 USC 119 from Japanese Patent Application No. 2017-197717 filed Oct. 11, 2017.

BACKGROUND

Technical Field

The present disclosure relates to an information processing apparatus and a non-transitory computer readable medium storing a program for access control.

SUMMARY

Aspects of non-limiting embodiments of the present disclosure relate to, in allowing a user who is not authorized to use a resource to use the resource, reducing the risk of inappropriate use of the resource compared with entire authorization of the user to use the resource.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising a processor configured to: receive, from a first user authorized to access a resource, an access control setting applicable to a second user, the access control setting set within an authority of the first user; receive, in response to a successful authentication of the second user, an access permission request for the resource from the second user; and request, if what is requested in the access permission request is allowed by the access control setting, the resource to execute a process according to the access permission request.

BRIEF DESCRIPTION OF DRAWINGS

Exemplary embodiment(s) of the present invention will be described in detail based on the following figures, wherein:

FIG. 3 is a diagram illustrating the access control setting screen;

FIG. 4 is a diagram illustrating the access permission request screen; and

DETAILED DESCRIPTION

Figure 1:
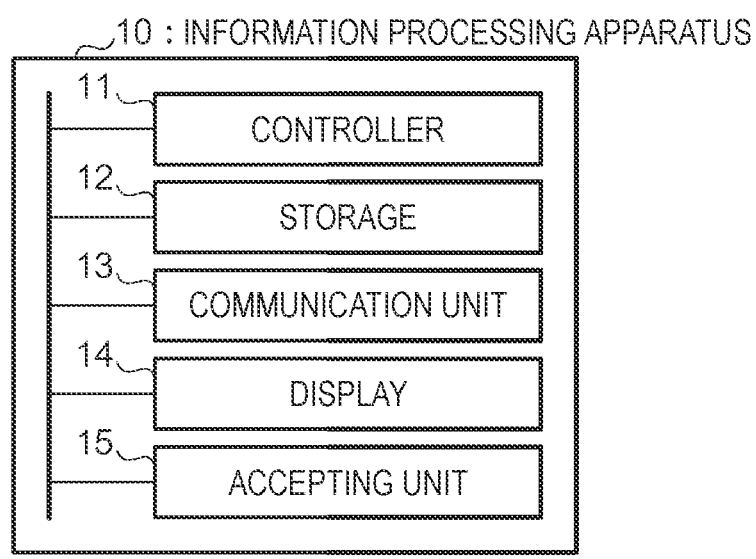
FIG. 1 is a diagram illustrating the hardware configuration of the information processing apparatus 10.

An exemplary embodiment of the present invention will be described below. FIG. 1 is a diagram illustrating the hardware configuration of an information processing apparatus 10. The information processing apparatus 10 includes a controller 11, a storage 12, a communication unit 13, and a display 14, and an accepting unit 15.

The controller 11 includes a processor, such as a central processing unit (CPU), and a memory, such as a read only memory (ROM) and a random access memory (RAM). The ROM stores firmware in which a procedure for starting up the hardware and the operation system (OS) is defined. The RAM is used to store data when the CPU executes an arithmetic operation. The storage 12 includes, for example, a semiconductor memory and a hard disk drive, and stores the OS and software such as application programs. The communication unit 13 includes a communication interface (I/F) for communicating with another electronic device, and is connected to a communication line such as a local area network (LAN). The memory and the storage 12 are hereinafter referred to as a storing unit.

The display 14 includes a display unit such as a liquid crystal display panel and displays a graphical user interface (GUI) with widgets for operating the information processing apparatus 10. The accepting unit 15 includes, for example, a keyboard and a pointing device, and accepts an operation on the GUI. Examples of the pointing device include a touch-sensitive panel on the surface of the display 14, a mouse, and a touchpad. The display unit 14 and/or the accepting unit 15 may be configured as a device separated from the information processing apparatus 10.

The storage 12 stores a program that defines a data output procedure pertaining to the embodiment, the program causing the controller 11 to execute the data output procedure, so that the information processing apparatus 10 can provide the following functions.

Figure 2:
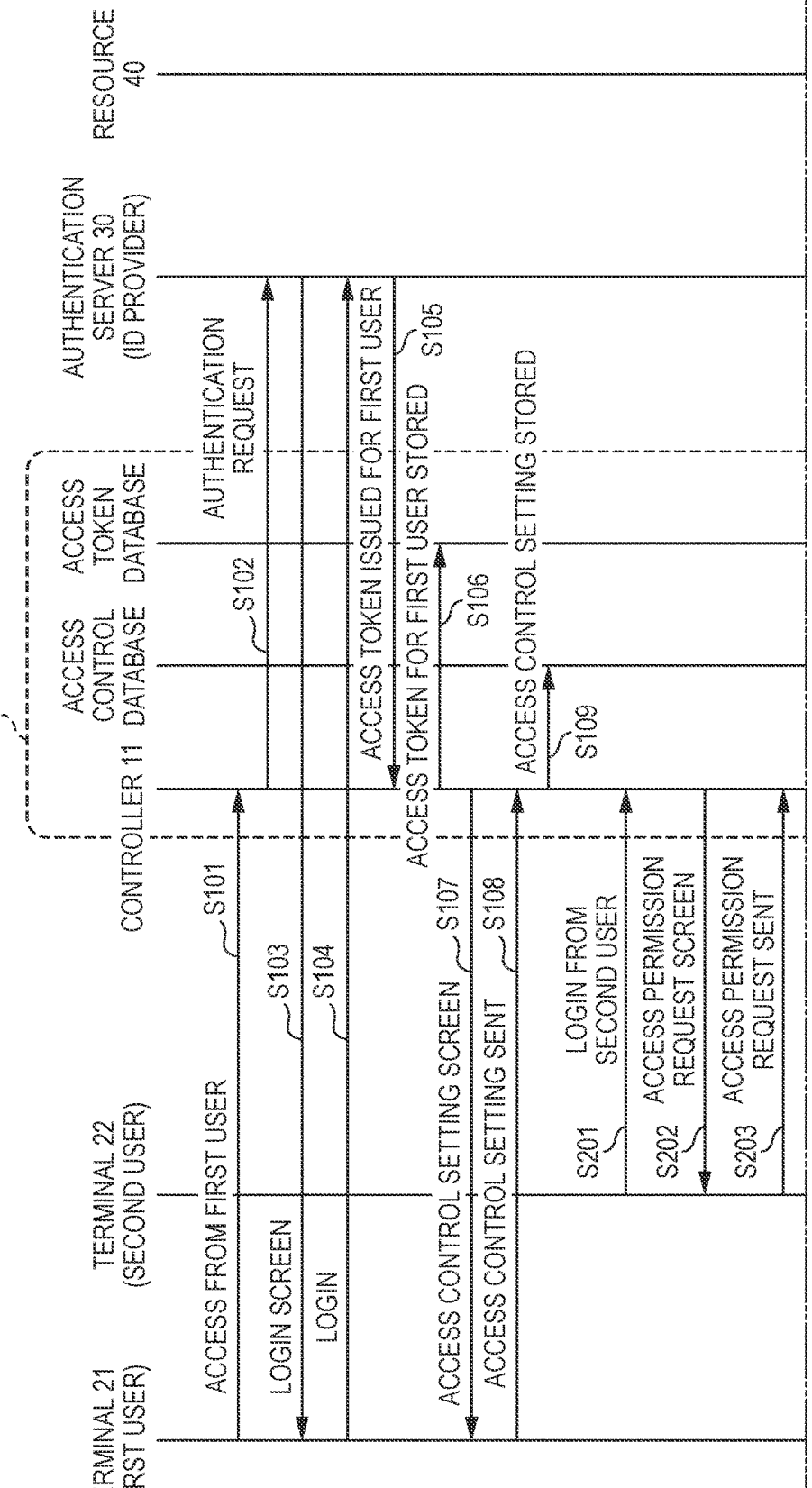
FIG. 2 is a sequence diagram.

FIG. 2 is a sequence diagram. The basic hardware configuration of the terminal 21, the terminal 22, and the authentication server 30, and the resource 40 is the same as that of the information processing apparatus 10. The terminal 21 and the terminal 22 are used by the first user and the second user, respectively. The first user and the second user have different attributes; for example, they belong to different organizations and/or departments, or they have different employment positions and/or job assignments. The figure shows an example case in which the first user works for Company A and the second user works for Company B, wherein Company A subcontracts part of its work to Company B. The first user is authorized to access the resource 40, but the second user is not.

Examples of the resource 40 include a hardware resource in a computer such as a processor, a memory, and a storage, and a software resource that works together with the hardware resource. In this example case, a document management system is used as an example of the resource 40. The document management system stores and manages data of electronic documents. The first user is authorized to access the document management system, but the second user is not.

The authentication server 30 manages user identifiers (IDs) and passwords, and authenticates a user ID and password combination received from an external unit. The authentication server 30 is run, for example, by an ID provider. The authentication server 30 issues an access token for a user who has been successfully authenticated. Once receiving the access token, the user can use the resource 40. The access token has an expiration date/time and gets deleted from the storage once the expiration date/time has passed.

Now, procedural steps are described using FIG. 2. At step S101, the first user starts a browser program at the terminal 21 to display the UI of the information processing apparatus 10, and requests the information apparatus 10 for an access to the document management system.

At step S102, the controller 11 sends an authentication request to the authentication server 30. At step S103, the authentication server 30 sends, to the terminal 21 via the information processing apparatus 10, data for displaying a login screen. At step S104, the terminal 21 displays the login screen where the first user can provide his/her user ID and password to log in. The terminal 21 sends the provided user ID and password to the authentication server 30 via the information processing apparatus 10.

At step S105, the authentication server 30 performs an authentication using the user ID and password received from the terminal 21. If the authentication is successful, the authentication server 30 issues an access token for the first user, and sends the access token to the information processing apparatus 10. The storage 12 of the information processing apparatus 10 has an access token database. At step S106, the controller 11 stores the access token received from the authentication server 30 in the access token database to associate the access token with the user ID of the first user. Steps 101 to 105 are performed as defined by a protocol, such as an OAuth 2.0 protocol.

At step S107, the controller 11 sends, to the terminal 21, data for displaying a screen where an access control of the document management system is set (hereinafter referred to as "access control setting screen").

FIG. 3 is a diagram illustrating the access control setting screen. The screen has a text "employee_12345, create an access control setting of the document management system," wherein employee_12345 indicates the user ID that has been sent from the terminal 21 at step S104.

The "Applicable User" field is used to input the user ID of a user (a second user) to whom the access control setting applies. The first user may enter the user ID of the second user in the text box. Or, the first user may also use the "Browse" button near the text box to show a list box with user IDs of users applicable to access control settings that were previously created, and select one of the user IDs from the list.

The "Allowed Server" field is used to input the identifier of a server that the second user is allowed to access (the server that runs the document management system). The first user may enter the identifier in the text box, or may also use the "Browse" button to show a list box from which the identifier can be selected.

The "Allowed Operation" field is used to input a type of operation that the second user is allowed to perform. The first user uses the control at the right end of the field to show a dropdown list with some operations as options, and selects one of the operations from the list. In this example, the list shows "See documents", "Update documents", "Edit documents", and "Delete documents" as the options.

The "Allowed Documents" field is used to input the filename(s) of a document or documents the second user is allowed to access. The first user may enter the filename(s) in the text box, or may also use the "Browse" button to show a list box from which the filename(s) can be selected. Examples of the document include specifications of the work that has been subcontracted from Company A to Company B.

The "Allowed Period" field is used to input a period during which the second user is allowed to access the document management system. The first user inputs the start date/time and the end date/time of the period in the field.

At step S108, once the first user completes the access control setting and selects "OK", the terminal 21 sends the access control setting to the information processing apparatus 10. The storage 12 of the information processing apparatus 10 has an access control database. At step S109, the controller 11 stores the access control setting received from the terminal 21 in the access control database, so that the access control setting is associated with the user ID of the first user.

The steps described so far involved interactions from the first user. The steps described below will involve interactions from the second users.

At step S201, the second user starts a browser program at the terminal 22 to display the UI of the information processing apparatus 10, and provide his/her user ID and password to log in. The user ID and password combination may be authenticated at the authentication server 30 or at the information processing apparatus 10. If the authentication is successful, the controller 11 sends, to the terminal 22, data for displaying a screen where a permission to access the document management system is requested at step S202 (hereinafter referred to as "access permission request screen").

FIG. 4 is a diagram illustrating the access permission request screen. The screen has a text "subcontractor_ABCDE, request a permission to access the document management system," wherein subcontractor_ABCDE indicates the user ID sent from the terminal 22 at step S201.

The "Access Controlling User" field is used to input the user ID of the user (the first user) who has set the access control setting of the document management system. The second user may enter the user ID in the text box. Or, the second user may also use the "Browse" button near the text box to show a list box with user IDs of users who created access control setting of the document management system in the past, and select one of the user IDs from the list.

The "Requested Server" field is used to input the identifier of a server that the second user wants to access (the server that runs the document management system). The second user may enter the identifier in the text box, or may also use the "Browse" button to show a list box from which the identifier can be selected.

The "Requested Operation" field is used to input a type of operation the second user wants to perform. The second user uses the control at the right end of the field to show a dropdown list with some operations as options, and selects one of the operations from the list. In this example, the list includes "See documents", "Update documents", "Edit documents", and "Delete documents" as the options.

The "Requested Documents" field is used to input the filename(s) of a document or documents the second user wants to access. The second user may input the filename(s) in the text box, or may also use the "Browse" button to show a list box from which the filename(s) can be selected.

At step S203, once the second user completes the access permission request and select "OK", the terminal 22 sends the access permission request to the information processing apparatus 10. At step S204, the controller 11 queries the access control database for an access control setting associated with the user ID of the access controlling user (employee_12345) in the access permission request received from the terminal 22.

At step S205, the controller 11 receives the access control setting from the access control database and compares the access permission request against the access control setting. More specifically, the following four things are checked: (1) the value set for "Requested Server" matches the value set for "Allowed Server", (2) the value set for "Requested Operation" matches the value set for "Allowed Operations", (3) the value(s) set for "Requested Documents" is/are included in the value(s) set for "Allowed Documents", (4) the date/time on which the access permission request was received is within the "Allowed Period". If all four conditions above are satisfied, the controller 11 queries the access token database for the access token of the first user at step S206.

At step S207, the controller 11 receives the access token of the first user from the access token database, and controls to store the access token in the memory.

At step S208, the controller 11 sends, to the resource 40 (the document management system), a process request with the access token. More specifically, the controller 11 generates a process request that includes each value set for "Requested Server", "Requested Operation", and "Requested Documents" in the access permission request, and sends the process request with the access token attached.

At step S209, the controller 11 receives a result of the process from the resource 40. The result of the process may be, for example, document data that corresponds to the value(s) set for "Requested Documents" in the access permission request. At step S210, the controller 11 sends the result of the operation (the document data) to the terminal 22, so that the second user can receive data of the requested document(s).

The embodiment above may be modified, for example, as in the following modification examples. More than one modification examples may be combined.

Modification Example 1

The controller 11 of the information processing apparatus 10 may notify the first user that the access permission request has been received by the second receiver 120. Ex) The first user may request issuance of the token in response to the notification and the token may be stored in the storing unit then.

Figure 5:
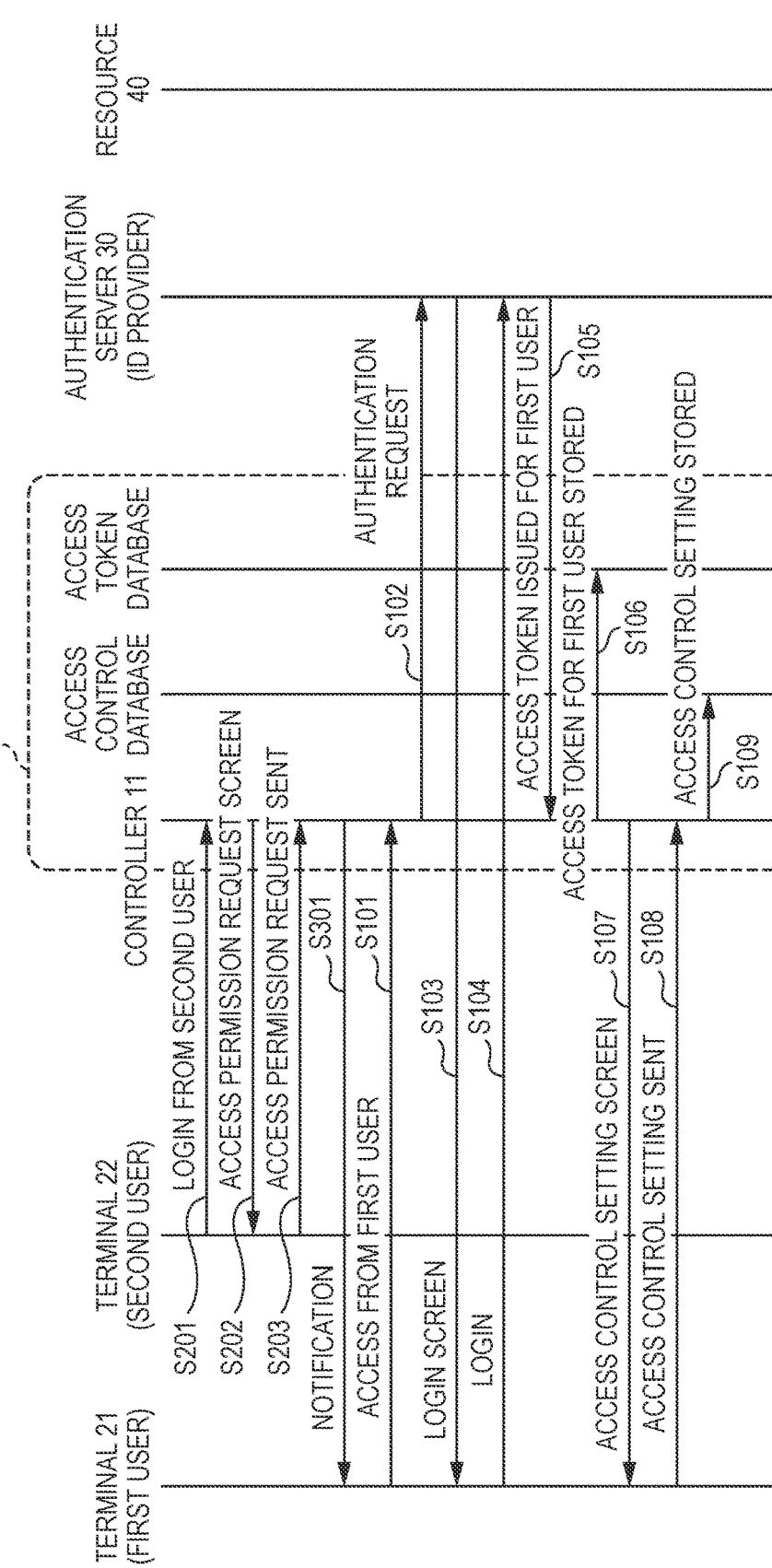
FIG. 5 is a sequence diagram.

FIG. 5 is a sequence diagram. In this example, steps 201 to 203 in the sequence diagram in FIG. 2 are performed at the beginning of the sequence, followed by steps 301 where the controller 11 notifies the terminal 21 that the access permission request is received. The terminal 21 displays a screen that informs the access permission request is received. Having seen the screen, the first user starts a browser program at the terminal 21 to display the UI of the information processing apparatus 10, and requests the information apparatus 10 for an access to the document management system at step S101, followed by steps 102 to 109, and then steps 204 to 210. This embodiment allows the access token of the first user to be issued after the access permission request is received.

Modification Example 2

The access token stored in the storage 12 may be deleted if a predetermined period of time has passed since the access token was last used.

Modification Example 3

The controller 11 of the information processing apparatus 10 may request, if the access permission request is received before a predetermined period of time has passed since an occurrence of an event, the resource 40 to execute the process according to the access permission request, wherein the event is defined as an indicator that an access to the resource 40 should be allowed. One example of the event may be an update of a specification stored in the document management system. When the specification is updated, the second user should receive an updated version of the specification. In this modification example, the controller 11 requests the resource 40 to execute the process according to the access permission request for a predetermined period of time (24 hours, for example) from the moment the specification is updated. With this modification example, the access control setting does not have to be set when the event occurs.

Modification Example 4

The controller 11 of the information processing apparatus 10 may notify, in response to the occurrence of the event, the second user of the occurrence of the event.

Modification Example 5

The program causing a computer to execute the process described above may be stored and provided in a non-transitory computer readable medium such as an optical recording medium and a semiconductor memory, or may also be distributed via a communication network such as the Internet. When the program pertaining to the present disclosure is stored in a non-transitory computer readable medium to be distributed, the computer reads the program from the recording medium to execute the program. When the program pertaining to the present disclosure is distributed via a communication network, the computer receives the program from a device of the distributor to execute the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a hardware processor configured to:
        receive, from a first user authorized to access a resource, an access control setting applicable to a second user, the access control setting being set within an authority of the first user;
        control to store an access token of the first user on a storing unit;
        receive, in response to a successful authentication of the second user, an access permission request for the resource from the second user;
        notify, in response to the access permission request being received from the second user, the first user that the access permission request has been received; and
        request, when what is requested in the access permission request is allowed by the access control setting, the resource to execute a process according to the access permission request, wherein
    the access token of the first user is used to request the resource to execute the process and the access token is issued in response to the first user responding to the notification.

2. The information processing apparatus according to claim 1, wherein
the hardware processor is further configured to:
delete the access token from the storing unit when a predetermined period of time has passed since the access token was last used.

3. The information processing apparatus according to claim 1, wherein
the access control setting includes a period during which the second user is allowed to access the resource.

4. The information processing apparatus according to claim 1, wherein
the hardware processor is further configured to:
request, when the access permission request is received before a predetermined period of time has passed since an occurrence of an event, the resource to execute the process according to the access permission request, wherein
the event is defined as an indicator that an access to the resource should be allowed.

5. The information processing apparatus according to claim 4, wherein
the hardware processor is further configured to:
notify, in response to the occurrence of the event, the second user of the occurrence of the event.

6. A non-transitory computer readable medium storing a program causing a computer to execute a process, the process comprising:
receiving an access control setting set by a first user authorized to access a resource, the access control setting being applicable to a second user and set within an authority of the first user;
controlling to store an access token of the first user on a storing unit;
receiving, in response to a successful authentication of the second user, an access permission request for the resource from the second user;
notifying, in response to the access permission request being received from the second user, the first user that the access permission request has been received; and
requesting, when the access permission request is requesting what is allowed by the access control setting, the resource to execute a process according to the access permission request, wherein
the access token of the first user is used to request the resource to execute the process and
the access token is issued in response to the first user responding to the notification.

\* \* \* \* \*